US008264733B2

(12) United States Patent
Hanashi et al.

(10) Patent No.: US 8,264,733 B2
(45) Date of Patent: Sep. 11, 2012

(54) IMAGE FORMING APPARATUS AND IMAGE FORMING METHOD FOR DETECTING LIGHT INTENSITIES

(75) Inventors: Ryo Hanashi, Moriya (JP); Shinya Suzuki, Abiko (JP)

(73) Assignee: Canon Kabushiki Kaisha (JP)

( * ) Notice: Subject to any disclaimer, the term of this patent is extended or adjusted under 35 U.S.C. 154(b) by 1119 days.

(21) Appl. No.: 11/733,302

(22) Filed: Apr. 10, 2007

(65) Prior Publication Data

US 2007/0237533 A1 Oct. 11, 2007

(30) Foreign Application Priority Data

Apr. 10, 2006 (JP) ................................. 2006-108041

(51) Int. Cl.
*G06K 15/00* (2006.01)

(52) U.S. Cl. ........ 358/1.18; 358/1.1; 358/474; 358/471; 358/400; 399/49

(58) Field of Classification Search ................. 358/1.18, 358/1.1, 474, 471, 400; 399/49, 76
See application file for complete search history.

(56) References Cited

U.S. PATENT DOCUMENTS

| | | | | |
|---|---|---|---|---|
| 5,592,306 | A * | 1/1997 | Cheng | 358/464 |
| 5,726,437 | A * | 3/1998 | Ashikaga et al. | 250/205 |
| 2004/0141765 | A1* | 7/2004 | Shimura et al. | 399/49 |
| 2005/0105937 | A1* | 5/2005 | Sakai | 399/301 |

FOREIGN PATENT DOCUMENTS

| | | | |
|---|---|---|---|
| JP | 07-036230 | A | 2/1995 |
| JP | 07-225138 | A | 8/1995 |
| JP | 11-295941 | A | 10/1999 |
| JP | 2002-179290 | A | 6/2002 |
| JP | 2002-211083 | A | 7/2002 |
| JP | 2004-125990 | A | 4/2004 |
| JP | 2005-017423 | A | 1/2005 |

OTHER PUBLICATIONS

Japanese Office Action in corresponding JP 2006-108041, dated Aug. 2, 2011.

* cited by examiner

*Primary Examiner* — Benny Q Tieu
*Assistant Examiner* — Martin Mushambo
(74) *Attorney, Agent, or Firm* — Rossi, Kimms & McDowell LLP

(57) ABSTRACT

An image forming apparatus that is capable of carrying out processes such as an image forming process in an efficient manner while reducing downtime. Laser beam is emitted onto an intermediate transfer belt. The light intensities of light scattered from the laser beam reflected by at least a part of the surface of the intermediate transfer belt are detected, and light intensity distribution information on the distribution of the detected light intensities are acquired. Phase information on phases on the intermediate transfer belt is acquired based on the light intensity distribution information. An image forming process in which an image is formed on the intermediate transfer belt is carried out in synchronization with a predetermined phase included in the acquired phase information.

6 Claims, 14 Drawing Sheets

FIG. 11A

| PHASE ADDRESS | LIGHT INTENSITY DISTRIBUTION INFORMATION |
|---|---|
| X1 | Sc1 |
| X2 | Sc2 |
| X3 | Sc3 |
| X4 | Sc4 |
| X5 | Sc5 |
| X6 | Sc6 |

FIG. 11B

| PHASE ADDRESS | BASE DENSITY |
|---|---|
| X101 | 0.07 |
| X102 | 0.07 |
| X103 | 0.04 |
| : | : |
| X1FF | 0.04 |
| X201 | 0.04 |
| X202 | 0.05 |
| X203 | 0.05 |
| : | : |
| X2FF | 0.07 |
| : | : |
| X6FF | 0.06 |

IMAGE FORMING APPARATUS AND IMAGE FORMING METHOD FOR DETECTING LIGHT INTENSITIES

BACKGROUND OF THE INVENTION

1. Field of the Invention

The present invention relates to an image forming apparatus and an image forming method, and more particularly to an image forming apparatus and an image forming method that carry out an image forming process in which an image is formed on an image bearing member.

2. Description of the Related Art

In image forming apparatuses, printing is performed in such a manner that a full-color image is formed by sequentially superposing toner images of respective colors on an intermediate transfer belt that is an image bearing member, and the formed full-color image is transferred onto a recording sheet.

Ordinarily, in such image forming apparatuses, a phase mark (registration mark) is formed by toner (developing agent) on the intermediate transfer belt, and toner images of respective colors are superposed on the intermediate transfer belt using the registration mark as the reference position (see Japanese Laid-Open Patent Publication (Kokai) No. H11-295941, for example). By the use of such a registration mark, toner images of respective colors can be registered in forming a full-color image. Also, some image forming apparatuses of the type that uses no registration mark, circumferential length information indicative of the circumferential length of the intermediate transfer is acquired, and the reference position at which image formation is started is determined based on the acquired circumferential length information.

The above-mentioned registration mark can also be used as the reference position for starting the formation of a reference density pattern (patch image) for use in correcting density characteristic information such as the density and tone of a toner image to be formed. It should be noted that how to correct density characteristic information (color calibration) is described in Japanese Laid-Open Patent Publication (Kokai) Nos. 2002-211083 and H07-036230, for example.

In the above-described image forming apparatuses, however, it is necessary to cause the endless intermediate transfer belt to rotate idle until the reference position is identified (detected) on the intermediate transfer belt. Thus, there is downtime (wasted time) corresponding to the time required to identify the reference position at which image formation is (i.e. the time during which the intermediate transfer belt is caused to rotate idle). For this reason, it is impossible to carry out image formation and correction of density characteristic information in an efficient manner.

The surface of the intermediate transfer belt tends to be scratched by rotation of the intermediate transfer belt itself and abutment of a member that abuts on and separates from the intermediate transfer belt. Also, thickness changes and expansion/contraction of the intermediate transfer belt may occur due to long-term usage. For this reason, the physical properties of the intermediate transfer belt change, causing the circumferential length of the intermediate transfer belt to change. This makes it difficult not only to identify the reference position at which image formation is started but also to register images of respective colors constituting a full-color image. In this case as well, there is downtime, and hence image formation cannot be carried out in an efficient manner.

SUMMARY OF THE INVENTION

The present invention provides an image forming apparatus and an image forming method that are capable of carrying out processes such as an image forming process in an efficient manner while reducing downtime.

In a first aspect of the present invention, there is provided an image forming apparatus that carries out an image forming process in which an image is formed on an image bearing member, comprising: a light emitting unit adapted to emit laser beam onto the image bearing member; a light intensity detecting unit adapted to detect light intensities of light scattered from the laser beam reflected by at least a part of a surface of the image bearing member; a light intensity distribution information acquiring unit adapted to acquire light intensity distribution information on a distribution of the detected light intensities in the part; a phase information acquiring unit adapted to acquire phase information on phases on the image bearing member based on the light intensity distribution information; and a processing unit adapted to carry out the image forming process in synchronization with a predetermined phase included in the acquired phase information.

The image forming apparatus can further comprise an image bearing member density detecting unit adapted to detect a density of the image formed on the image bearing member.

The image bearing member density detecting unit can be adapted to detect the density of the image formed on the image bearing member in response to acquisition of the phase information by the phase information acquiring unit.

The processing unit can comprise a density characteristic information correcting unit adapted to correct density characteristic information comprising at least one of a density and a tone of an image to be formed on the image bearing member, and a table creating unit adapted to create a table in which the acquired phase information and the density characteristic information are associated with each other.

The image forming apparatus can further comprise updating unit adapted to update the created table.

The image bearing member can comprise at least one of an intermediate transfer member and a photosensitive member.

In a second aspect of the present invention, there is provided an image forming method for carrying out an image forming process in which an image is formed on an image bearing member, comprising: a light emitting step of emitting laser beam onto the image bearing member; a light intensity detecting step of detecting light intensities of light scattered from the laser light reflected by at least a part of a surface of the image bearing member; a light intensity distribution information acquiring step of acquiring light intensity distribution information on a distribution of the detected light intensities in the part; a phase information acquiring step of acquiring phase information on phases on the image bearing member based on the light intensity distribution information; and a processing step of carrying out the image forming process in synchronization with a predetermined phase included in the acquired phase information.

The image forming method can further comprise an image bearing member density detecting step of detecting a density of the image formed on the image bearing member.

In the image bearing member density detecting step, the density of the image formed on the image bearing member can be detected in response to acquisition of the phase information in the phase information acquiring step.

The processing step can comprise a density characteristic information correcting step of correcting density characteristic information comprising at least one of a density and a tone of an image to be formed on the image bearing member, and a table creating step of creating a table in which the acquired phase information and the density characteristic information are associated with each other.

The image forming method can further comprise an updating step of updating the created table.

The image bearing member can comprise at least one of an intermediate transfer member and a photosensitive member.

According to the present invention, light intensities of scattered light reflected by laser beam emitted on the image bearing member are detected, light intensity distribution information on the distribution of light intensities and phase information on phases on the image bearing member are acquired based on the detected light intensities, and a predetermined process is carried out in synchronization with a predetermined phase included in the phase information. Thus, the need to form a registration mark as in the prior art is eliminated, and the circumferential length of the image bearing member does not change. As a result, it is possible to carry out processes such as image formation in an efficient manner while reducing downtime.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the present invention and, together with the description, serve to explain the principles of the present invention.

FIGS. 8A and 8B are diagrams showing light intensities of scattered light from the irradiated surface of the intermediate transfer belt detected by a CCD sensor appearing in FIG. 6, wherein FIG. 8A shows a first example in which the surface of the intermediate transfer belt is relatively rough, and FIG. 8B shows a second example in which the surface of the intermediate transfer belt is relatively smooth;

FIGS. 11A and 11B are block diagrams showing reference tables created in a step S604 in FIG. 10, wherein FIG. 11A shows a reference table in which the phase addresses in FIG. 9 and speckle contrasts are associated with each other, and FIG. 11B shows a reference table in which the phase addresses in FIG. 9 and base densities of the intermediate transfer belt that is a base are associated with each other;

DETAILED DESCRIPTION OF THE PREFERRED EMBODIMENTS

Preferred embodiments of the present invention will be described in detail below with reference to the drawings.

Figure 1:
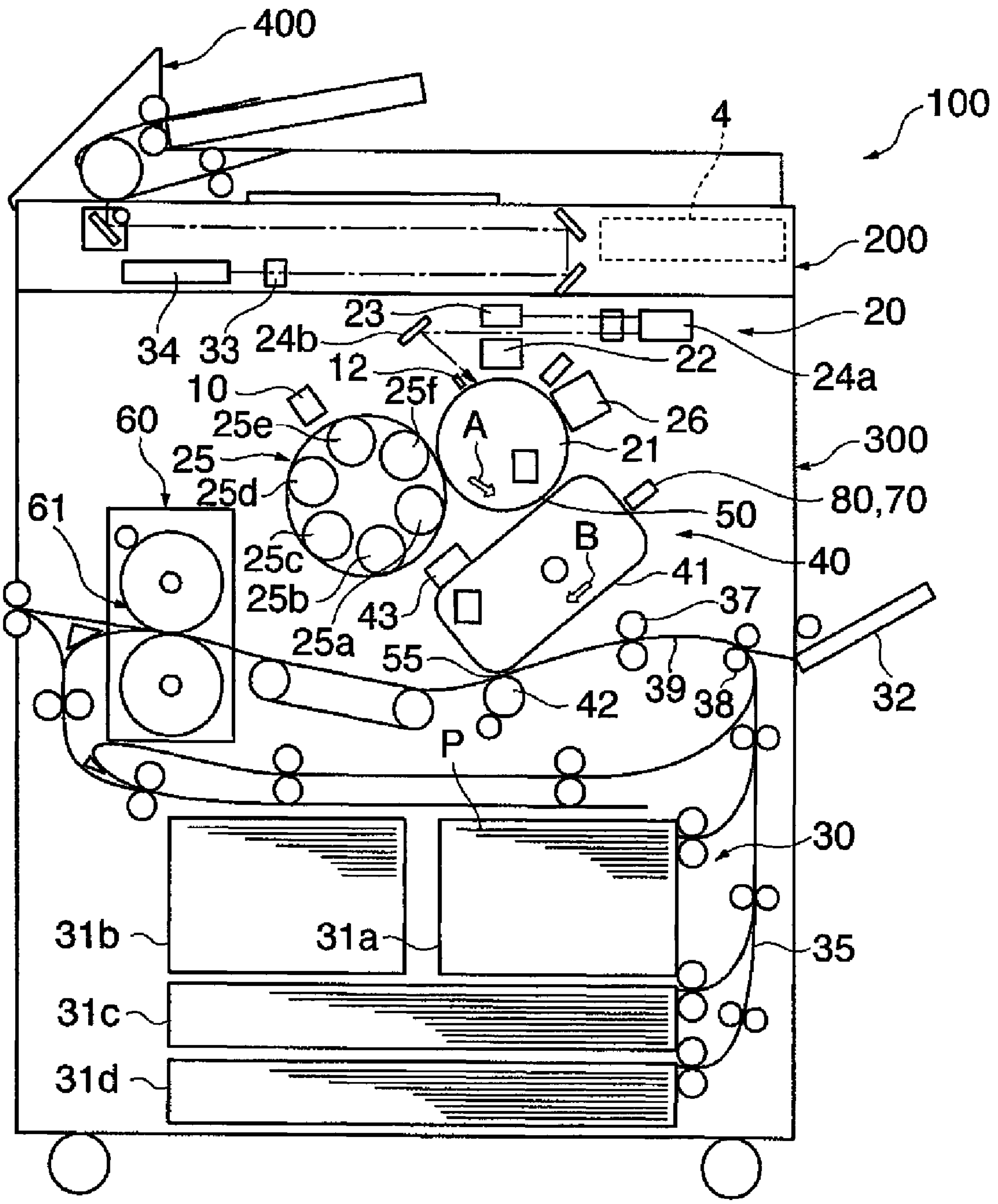
FIG. 1 is a view schematically showing the construction of a copying machine that is an image forming apparatus according to a first embodiment of the present invention.

FIG. 1 is a view schematically showing the construction of a copying machine that is an image forming apparatus according to a first embodiment of the present invention.

The copying machine 100 in FIG. 1 is a color-image forming apparatus capable of forming images in full color up to six colors. The copying machine 100 is comprised of a scanner section 200 that scans an image on an original to acquire full-color image information, and a printer section 300 that forms an image corresponding to image information from the scanner section 200 on a recording sheet that is a sheet material. An automatic original feeder (RDF: Recirculating Document Feeder) 400 that automatically feeds an original to be scanned-in by the scanner section 200 from among a plurality of originals is disposed in on top of the scanner section 200.

In the scanner section 200, an operating section 4 with a display screen is disposed. The operating section 4 is used, for example, to set the number of copies to be made, select recording sheets as copying sheets, and select a face-up discharge mode or a face-down discharge mode as a sheet discharge mode. If an an error such as jamming occurs inside the copying machine 100, this is indicated on the display section of the operating section 4.

The printer section 300 is comprised of an image forming section 20, a sheet feed section 30, an intermediate transfer section 40, a fixing section 60, and a CPU 101, not shown in FIG. 1 and described later with reference to FIG. 6. In the intermediate transfer section 40, a density sensor 70 in FIG. 2, described later, and a position sensor 80 in FIG. 6, described later, are disposed. These component elements are controlled by the CPU 101.

A detailed description will now be given of component elements of the copying machine 100.

The image forming section 20 is equipped with a drum-type electrophotographic photosensitive member (hereinafter referred to as "the photosensitive drum") 21 that is an image bearing member. The photosensitive drum 21 is comprised of an aluminum drum base pivotally supported at the center thereof in such a manner that it can freely rotate, and a negatively charged organic photosensitive member (organic photoreceptor: OPC), and has a photoconducting layer. The photosensitive drum 21 is driven to rotate in a direction indicated by an arrow A in FIG. 1 by a drive motor, not shown.

In the direction in which the photosensitive drum 21 rotates, a charging unit 22, an exposure unit 23, a polygon mirror (rotary polygon mirror) 24*a*, a reflection mirror 24*b*, a developing unit 25, and a cleaning unit 26 are disposed in opposed relation to a periphery of the photosensitive drum 21.

The charging unit 22 causes a charging bias applied from a charging bias power supply, not shown, to negatively charge the photosensitive drum 21 so that the surface of the photosensitive drum 21 can be at a predetermined potential. The exposure unit 23 then emits laser beam modulated in accordance with image information (image signal) received from the scanner section 200. Further, the exposure unit 23 scans the photosensitive drum 21 by exposing it to the emitted laser beam via the reflection mirror 24*b*, so that an electrostatic latent image is formed on the surface of the photosensitive drum 21. The power (light intensity) of the laser beam can be changed, for example, in 15 levels by changing the output current of the exposure unit 23.

The developing unit 25 is comprised of a revolver-type rotary developing unit that stores yellow (Y), magenta (M), cyan (C), and black (Bk) toners, and first and second spot color toners (developing agents). A developing bias of the same polarity as the polarity (negative polarity) of the charged photosensitive drum 21 is applied to the developing unit 25, and this developing bias attaches the toners of the respective colors to the photosensitive drum 21, so that the above-mentioned electrostatic latent image is developed (made visible) as a full-color toner image.

By the above-described process, the image forming section 20 carries out image formation. As will be described later, the full-color toner mage is primarily transferred onto an intermediate transfer belt 41, which is an image bearing member of the intermediate transfer section 40, at a primary transfer position 50 appearing in FIG. 1.

Between the primary transfer position 50 and the charging unit 22, the cleaning unit 26 is disposed in opposed relation to the photosensitive drum 21. After the transfer of a full-color toner image, the cleaning unit 26 collects remaining toners on the photosensitive drum 21 using a cleaner blade to clean the surface of the photosensitive drum 21.

The intermediate transfer belt 41 of the intermediate transfer section 40 is an endless belt comprised of, for example, PET (polyethylene terephthalate) or PVdF (polyvinylidene-fluoride). At the primary transfer position 50 appearing in FIG. 1, the intermediate transfer belt 41 is opposed to the photosensitive drum 21, and at a secondary transfer position 55 appearing in FIG. 1, the intermediate transfer belt is opposed to a secondary transfer roller 42 disposed on a sheet feed guide 39 of the sheet feed section 30. A secondary transfer bias of the opposite polarity (positive polarity) to the polarity of the toners is applied to the secondary transfer roller 42, and the secondary transfer roller 42 urges the intermediate transfer belt 41 with moderate pressure.

At the primary transfer position 50, a full-color toner image on the photosensitive drum 21 is primarily transferred as a primary transfer image onto the intermediate transfer belt 41 by electrostatic force caused by a primary transfer bias of the opposite polarity (positive polarity) to the polarity of the toners and urging force applied from the intermediate transfer belt 41. The primary transfer image thus primarily transferred is conveyed in a direction indicated by an arrow B in FIG. 1 (hereinafter referred to as "the belt running direction") by the intermediate transfer belt 41. At the secondary transfer position 55, the primary transfer image is secondarily transferred onto a recording sheet conveyed by the sheet feed section 30 as will be described later.

Figure 3:
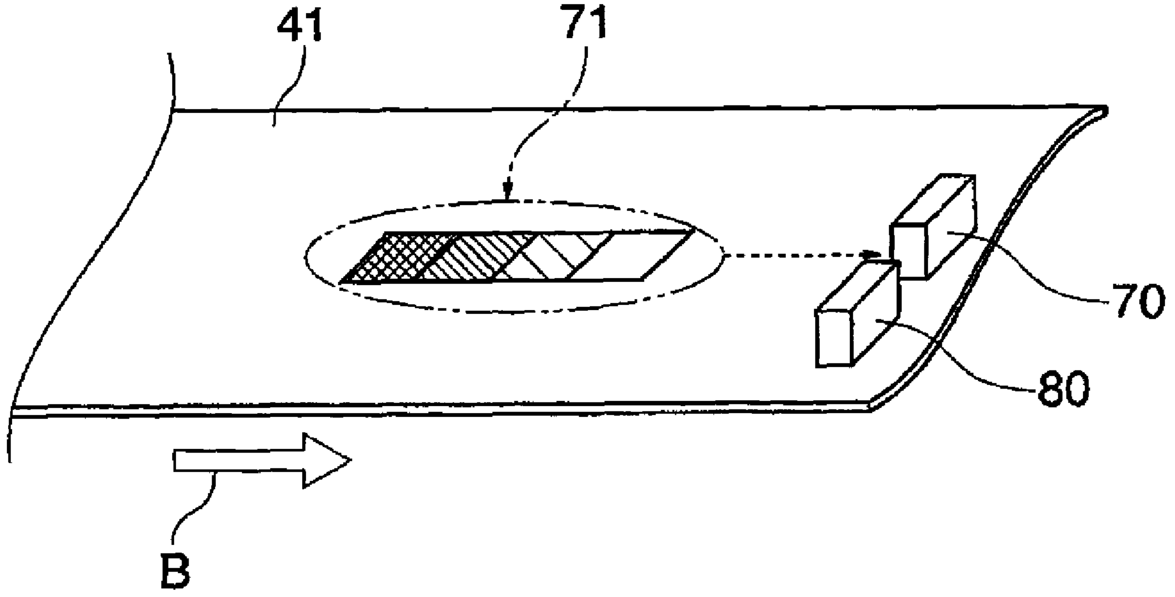
FIG. 3 is a perspective view of FIG. 2.
Figure 4:
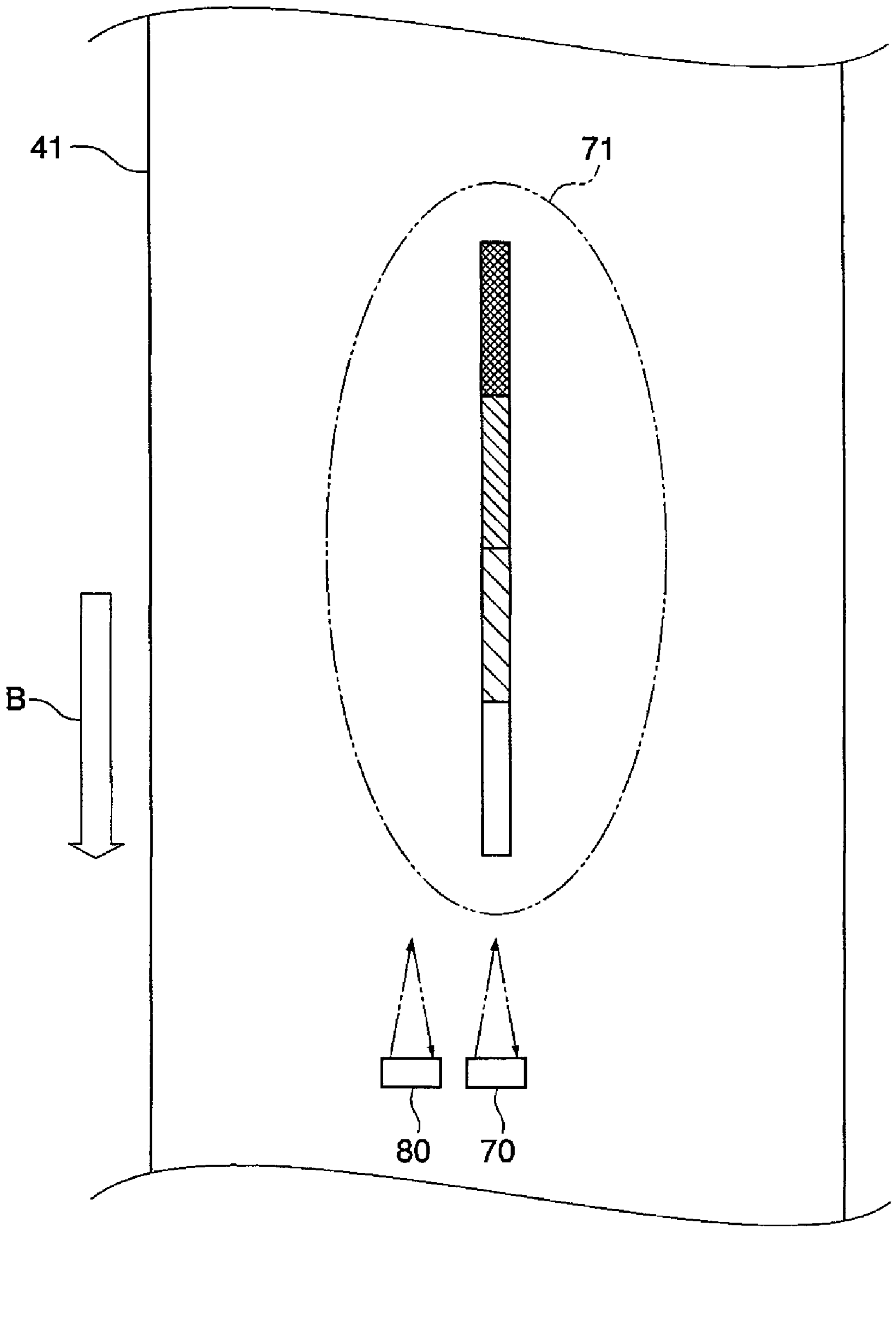
FIG. 4 is a top view of FIG. 2.

Between the primary transfer position 50 and the secondary transfer position 55, the density sensor 70 and the position sensor 80 are disposed downstream of the primary transfer position 50 in the belt running direction and in opposed relation to the intermediate transfer belt 41 (see FIGS. 3 and 4). Between the secondary transfer position 55 and the primary transfer position 50, a cleaning unit 43 is disposed downstream of the secondary transfer position 55 in the belt running direction and in opposed relation to the intermediate transfer belt 41. Upon completion of the secondary transfer, the cleaning unit 43 collects remaining toners on the intermediate transfer belt 41 using a cleaner blade to clean the surface of the intermediate transfer belt 41.

The sheet feed section 30 has a conveying path for conveying recording sheets P housed in sheet feed cassettes toward the secondary transfer position 55 on a sheet-by-sheet basis using a plurality of pairs of drawing rollers and others. The conveying path is comprised of a sheet feed guide 35, the sheet feed guide 39 connected to the sheet feed guide 35, and so on. Cassettes 31*a*, 31*b*, 31*c*, and 31*d* and a manual feed tray 32 are provided as the sheet feed cassettes.

The sheet feed section 30 is further comprised of a pair of registration rollers 37 and a pair of pre-registration rollers 38 disposed on the sheet feed guide 39. The registration rollers 37 carries out time adjustment required to feed a recording sheet P to the secondary transfer position 55 in accordance with timing in which image formation is carried out by the image forming section 20 and timing in which a primary transfer image is conveyed by the intermediate transfer section 40.

The primary transfer image conveyed from the intermediate transfer belt 41 of the intermediate transfer section 40 is secondarily transferred onto the recording sheet P fed from the registration rollers 37 to the secondary transfer position 55.

The fixing section 60 carries out a fixing process in which a toner image, which has already been transferred to the surface of a recording sheet P, is fixed as a permanent image by heat. In this case, a pair of fixing rollers 61 heats and pressurizes the recording sheet P and the toner image by a nip portion. The recording sheet P on which the toner image has been fixed by the fixing section 60 is discharged from the copying machine 100.

Figure 2:
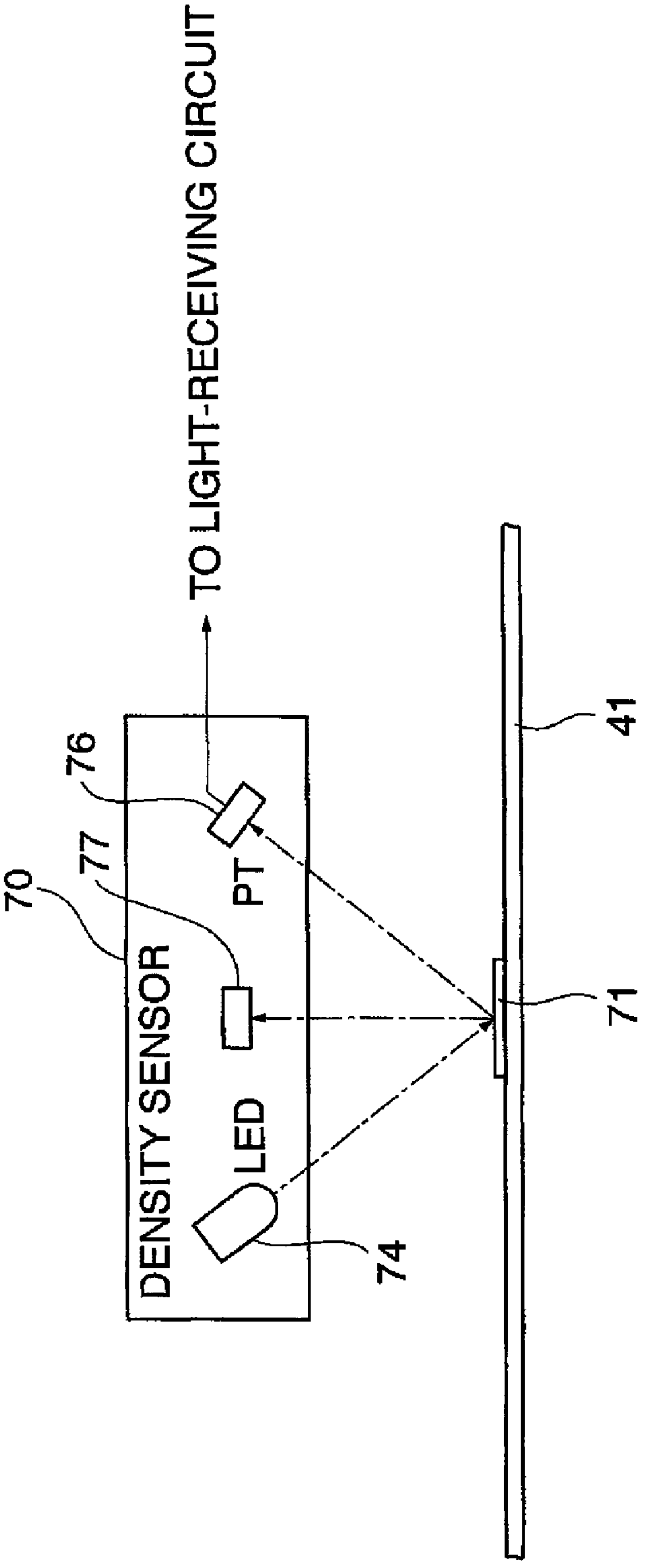
FIG. 2 is a block diagram showing in detail the construction of a density sensor appearing in FIG. 1.

FIG. 2 is a block diagram showing in detail the construction of the density sensor 70 appearing in FIG. 1. FIG. 3 is a perspective view of FIG. 2. FIG. 4 is a top view of FIG. 2.

As shown in FIG. 2, the density sensor 70 is comprised of an LED 74 that is a light-emitting element, and photodiodes (PD) 76 and 77 that are light-receiving elements. The LED 74 and the PDs 76 and 77 are controlled by the CPU 101 (see FIG. 6). The LED 74 irradiates the intermediate transfer belt 41 with light such as infrared light at an irradiation angle of 45° with respect to a normal to the surface of the intermediate transfer belt 41 to which the density sensor 70 is opposed. The PD 76 receives light reflected by the infrared light from the LED 74 at a reception angle of −45° with respect to the above-mentioned normal. The PD 77 is disposed on the above-mentioned normal, for receiving light reflected by the infrared light from the LED 74.

As shown in FIGS. 2 to 4, a group of toner images (hereinafter referred to as "a patch image") 71 is formed on the intermediate transfer belt 41 so that toner densities of respective colors can be detected on a trial basis using the density sensor 70. The patch image 71 is comprised of images each of which has a predetermined number of different densities allowing correction of tone correction curves of respective colors, for example, eight different toner densities (hereinafter referred to as "patch densities"). It should be noted that the patch image 71 appearing in FIGS. 3 and 4 includes yellow (Y), magenta (M), cyan (c), and black (Bk) toner images and does not include first and second spot-color toner images, but may include first and second spot-color toner images.

When the LED 74 irradiates the patch image 71 with infrared light, regularly reflected components and irregularly reflected components of light reflected by the infrared light enter the PD 76. Only irregularly reflected components of the reflected light enter the PD 77. The PDs 76 and 77 measure the quantity of the reflected light received and input two measurement results to the CPU 101. The CPU 101 carries out predetermined computations from the two measurement results to obtain patch densities of the respective colors constituting the patch image 71. As a consequence, the patch density detecting accuracy can be enhanced while eliminating the effects of variations in the state of the surface of the intermediate transfer belt 41 as the base under the patch image 71 and the distance between the density sensor 70 and the patch image 71 on the quantity of irregularly reflected components of the reflected light. This makes it possible to detect the toner density of a black toner image from which reflected light includes almost no irregularly reflected components.

Next, a description will be given of a tone correcting process using patch densities detected as described above. This tone correcting process is intended to keep toner densities constant and maintain uniform tones by correcting the toner densities of respective colors based on detected patch densities.

Figure 5:
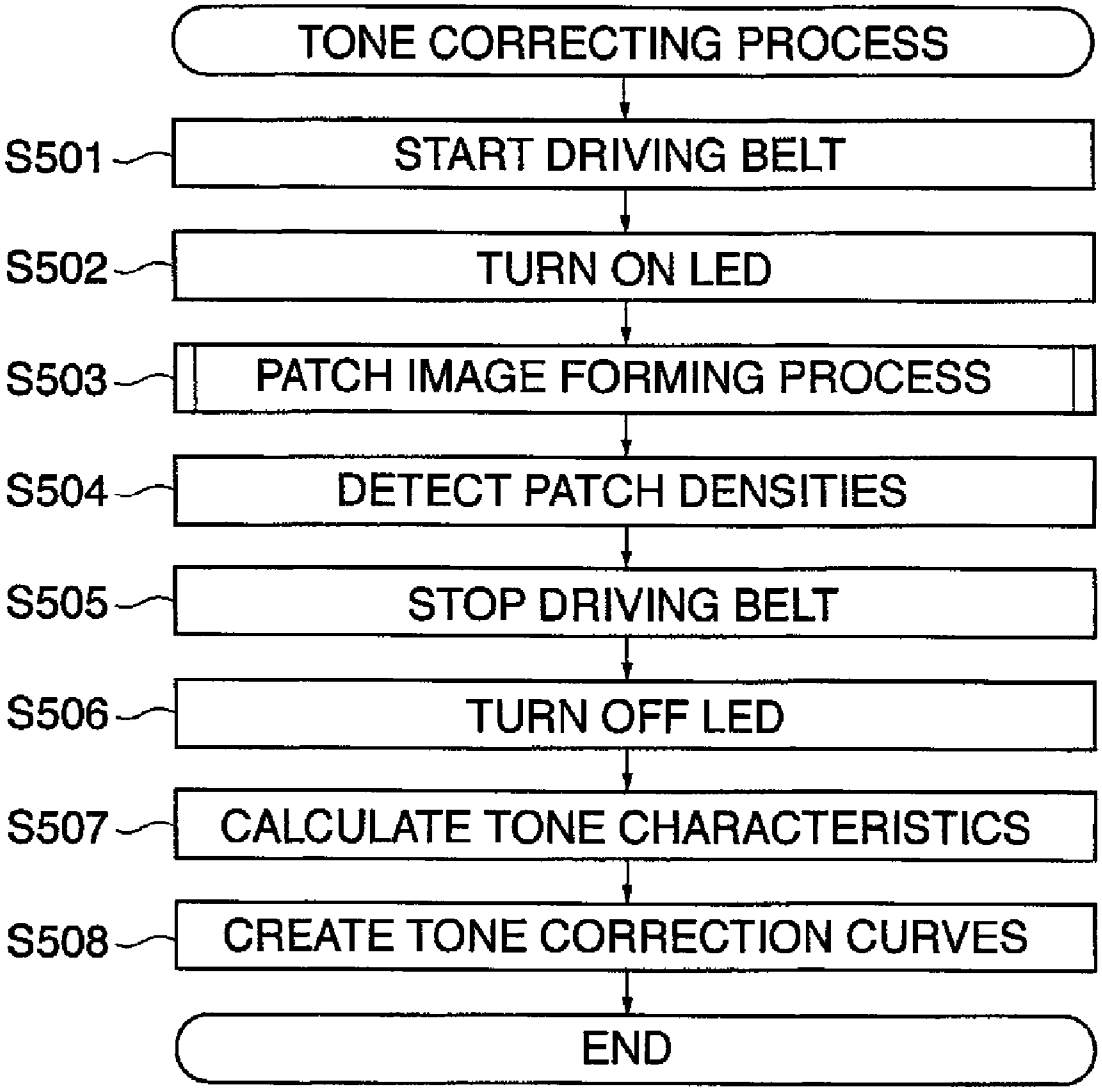
FIG. 5 is a flow chart showing a tone correcting process carried out by the copying machine in FIG. 1.

FIG. 5 is a flow chart showing the tone correcting process carried out by the copying machine 100 in FIG. 1.

It should be noted that this process is carried out before image formation on a recording sheet P is started. Also, this process may be carried out in predetermined timing, for example, when power supply to the copying machine 100 is turned on, when the copying apparatus 100 returns from a shutdown state, after a predetermined number of prints are made, when a predetermined time period has elapsed, or when a change in the environment where the copying machine 100 is used is detected.

As shown in FIG. 5, in starting the tone correcting process, first, the CPU 101 of the copying machine 100 starts driving the intermediate transfer belt 41 (step S501) and turns on the LED 74 of the density sensor 70 (step S502).

Next, in a step S503, the CPU 101 of the copying machine 100 carries out a patch image forming process in FIG. 10, described later, to form a patch image 71 on the intermediate transfer belt 41.

The density sensor 70 then detects the patch densities of the patch image 71 (step S504). Thereafter, the CPU 101 of the copying machine 100 stops driving the intermediate transfer belt 41 (step S505) and turns off the LED 74 of the density sensor 70 (step S506).

Next, in a step S507, the CPU 101 of the copying machine 100 calculates tone characteristics of respective colors based on the detected patch densities and creates tone correction curves based on the calculated tone characteristics (step S508) On this occasion, density correction tables created in advance so as to correct densities of toners of respective colors stored in the developing unit 25 are also corrected based on the patch densities, followed by terminating the tone correcting process. The tone correction curves and the density correction tables thus obtained are used for image formation carried out afterward.

According to the tone correcting process in FIG. 5, since patch densities are detected (step S504) to calculate tone characteristics (step S507) and obtain tone correction curves and tone correction tables (density characteristic information) (step S508), it is possible to provide color images with stable color tones.

Next, a description will be given of how phases on the intermediate transfer belt 41 are detected during the tone correcting process in FIG. 5.

Figure 6:
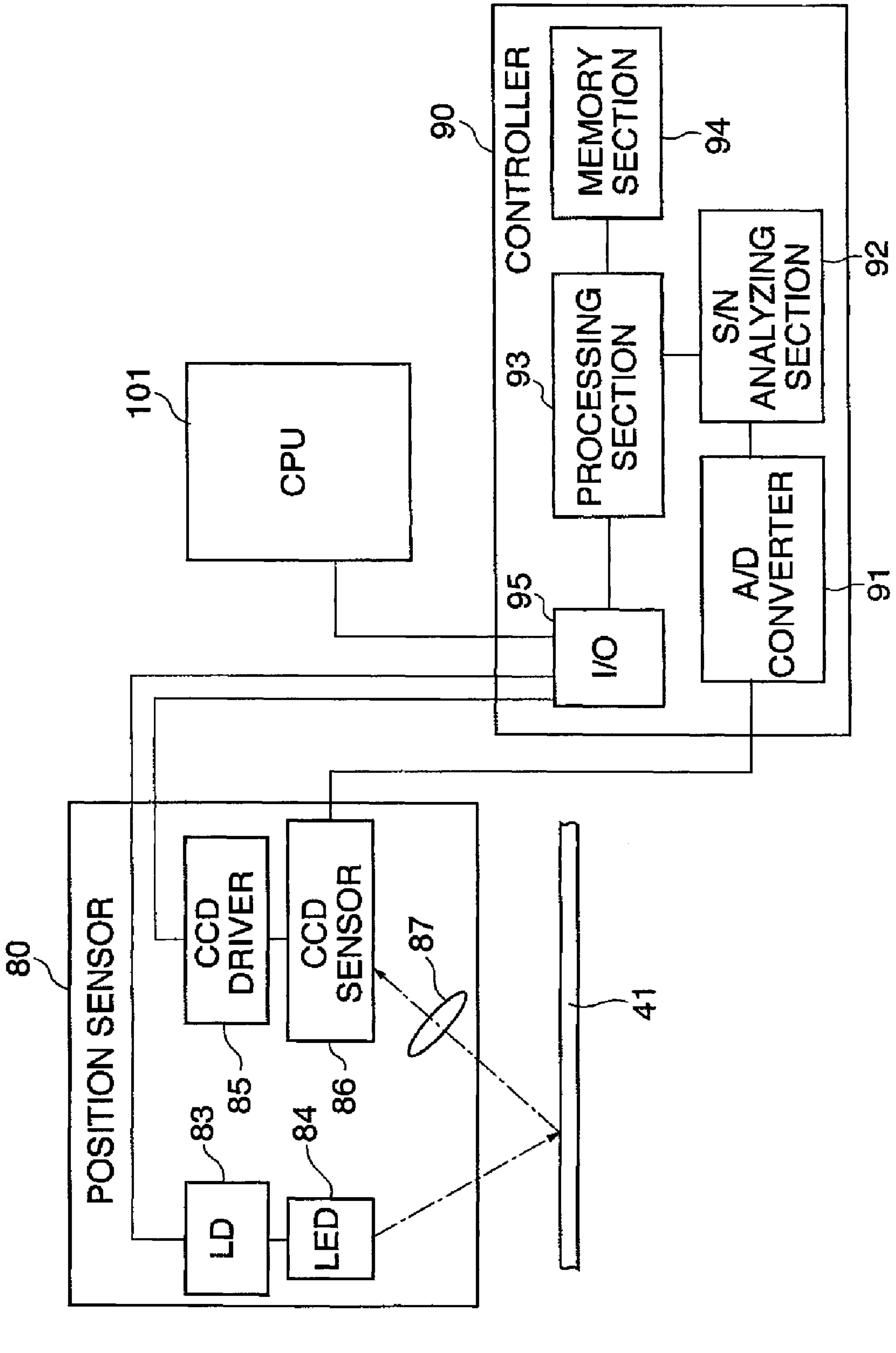
FIG. 6 is a block diagram showing in detail the constructions of a position sensor and a controller therefor appearing in FIG. 1.

FIG. 6 is a block diagram showing in detail the constructions of the position sensor 80 appearing in FIG. 1 and a controller therefor.

As shown in FIGS. 3 and 4, the position sensor 80 in FIG. 6 is disposed at a location adjacent to the density sensor 70 in the direction perpendicular to the belt running direction (i.e. the direction indicated by the arrow B) and in opposed relation to the intermediate transfer belt 41. That is, the position sensor 80 and the density sensor 70 are disposed at the same position in the direction perpendicular to the belt running direction. With this arrangement, the usage of cross-sectional space in the copying machine 100 can be minimized.

As shown in FIG. 6, the position sensor 80 is comprised of an LED 84 that is a light-emitting element, a CCD sensor 86 that is a light-receiving element, and a lens 87 disposed in front of the acceptance surface of the CCD sensor 86, and is connected to a controller 90 that controls these component elements. The controller 90 is connected to the CPU 101, and the position sensor 80 operates under control of control signals transmitted from the CPU 101 via the controller 90, The LED 84 (light emitting means) is controlled by a laser driver (LD) 83 to emit coherent laser beam toward the intermediate transfer belt 41 at a radiation angle of 45° with respect to a normal to the surface of the intermediate transfer belt 41 to which the density sensor 70 is opposed. The position of a surface (irradiated surface) of the intermediate transfer belt 41 irradiated by laser beam from the LED 84 is adjusted so that the diameter of a spot (hereinafter referred to as "the spot diameter"), not shown, of the laser beam on the irradiated surface can be, for example, 10 mm. It should be noted that a lens or the like is preferably used so as to increase the spot diameter. Also, the spot should not necessarily be circular, but may be substantially oval.

The CCD sensor 86 is controlled by a CCD driver 85 and uses its acceptance surface to receive regularly reflected light and scattered light of laser beam from the LED 84 at an acceptance angle of −45° with respect to the above-mentioned normal.

Incidentally, a multiplicity of microscopic asperities are formed on the surface of the intermediate transfer belt 41, and the asperities are random in conditions (properties such as depths and intervals). For this reason, when reflected on the surface of the intermediate transfer belt 41, laser beam from the LED 84 is scattered to become scattered light depending on the conditions of the asperities. The scattered light is transmitted in a free space from the surface irradiated by the laser beam to the acceptance surface of the CCD sensor 86. The scattered light, however, varies in optical path length, and hence light intensities I thereof are increased or decreased depending on optical path lengths (interference of light). The CCD sensor 86 picks up an optical image with such interference of light, i.e. an image formed on the acceptance surface as an image of an irradiated surface of the intermediate transfer belt 41 (hereinafter referred to as "a spot image") and inputs the image to the controller 90.

Thus, the position sensor 80 in FIG. 6 functions as an image pickup device that shoots an irradiated surface of the intermediate transfer belt 41 as a subject and acquires the resulting spot image as an electric signal responsive to light intensities.

Figure 7:
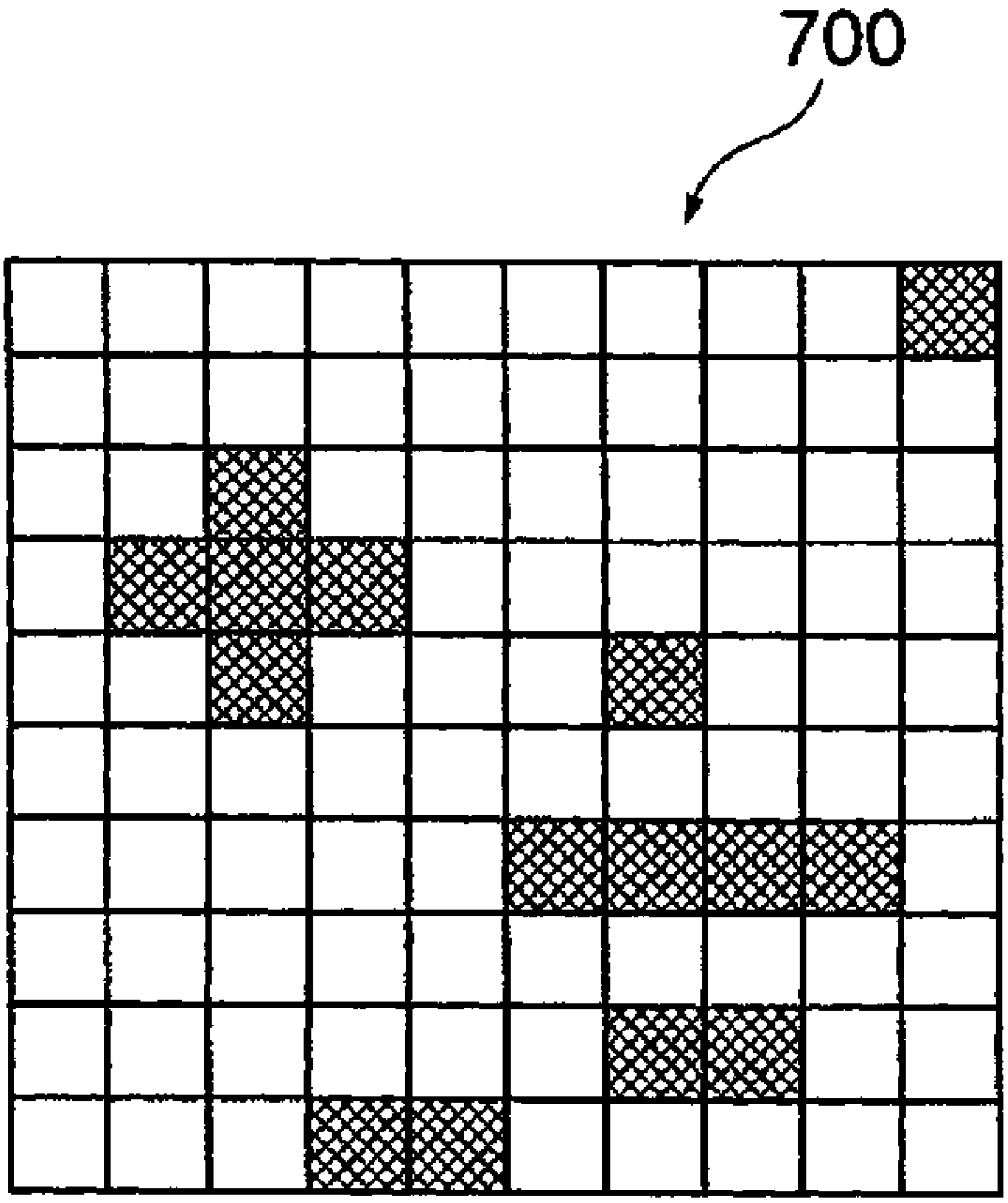
FIG. 7 is a view showing a first example of a spot image (speckle) of an intermediate transfer belt shot by the position sensor in FIG. 6.

FIG. 7 is a diagram showing a first example of a spot image of the intermediate transfer belt 41 shot by the position sensor 80 in FIG. 6.

A speckled image 700 in FIG. 7 (hereinafter referred to as "a speckle") is a spot image of the intermediate transfer belt 41 shot by the position sensor 80 and corresponds to two-dimensional data obtained by binary-coding light intensities indicative of variations of light and shade of scattered light. It should be noted that in FIG. 7, pixels of the CCD sensor 85 are shown in the form of a 10- by 10-pixel matrix.

The speckle pattern of the speckle 700 reflects the light intensities I of light scattered from laser beam with interference of light as described above, in other words, the conditions of asperities on the surface of the intermediate transfer belt 41. Specifically, when asperities on the intermediate transfer belt 41 are rough, scattered light received from concave areas (shaded parts) adjacent to convex areas is darker than a threshold value. It should be noted that the areas from which scattered light is dark correspond to dark-colored areas of the speckle pattern of the speckle 700 in FIG. 7. On the other hand, the areas from which scattered light is lighter than the threshold value correspond to dark-colored areas of the speckle pattern of the speckle 700 in FIG. 7.

Figure 8A:
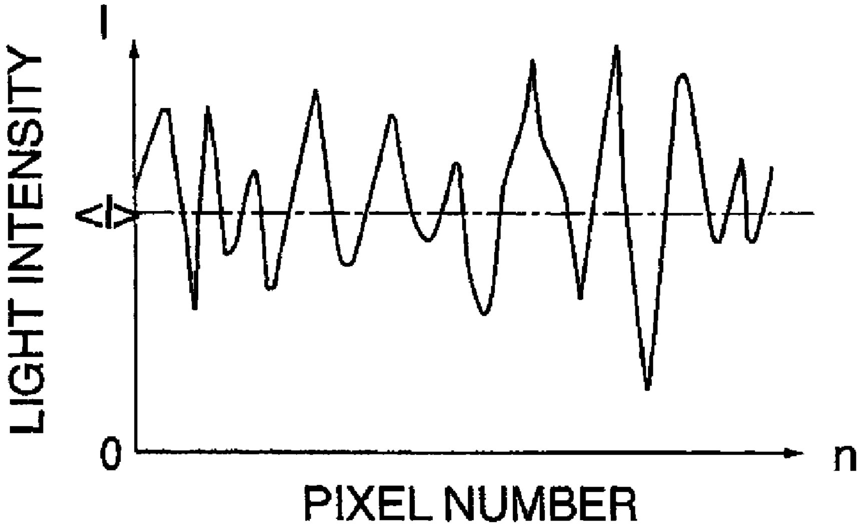
Figure 8B:
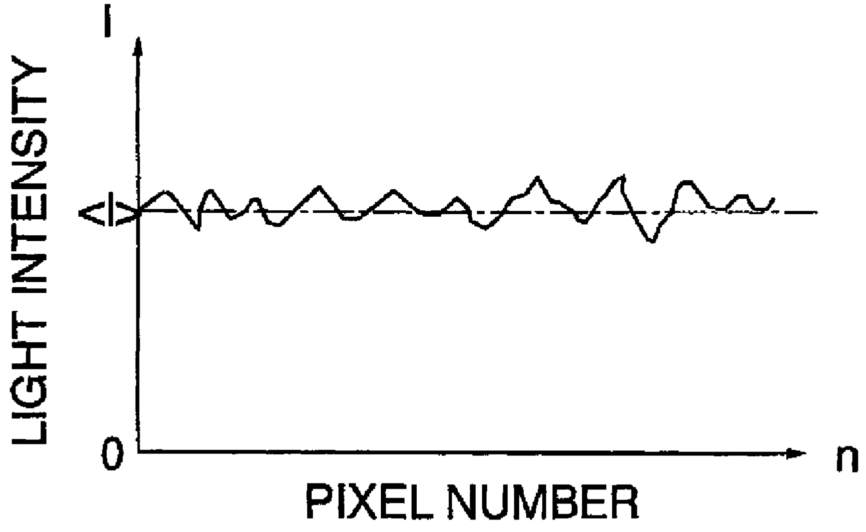

In view of the foregoing, it can be said that the speckle 700 in FIG. 7 reflects the conditions of asperities specific to the surface of the intermediate transfer belt 41 as the distribution of light intensities of scattered light. It should be noted that although in the above description, the speckle 700 corresponds to two-dimensional data obtained by binary-coding light intensities indicative of variations of light and shade of scattered light, the speckle 700 may correspond to multivalued two-dimensional data indicative of light intensities I of scattered light as shown in FIGS. 8A and 8B, referred to later. The use of multivalued data can improve the reproducibility of a spot image of the intermediate transfer belt 41.

Referring to FIG. 6 again, the controller 90 (light intensity distribution information acquiring means) is comprised of an A/D converting section 91, an S/N analyzing section 92 connected to the A/D converting section 91, a processing section 93 connected to the S/N analyzing section 92, a memory section 94 connected to the processing section 93, and an input/output (I/O) section 95 connected to the processing section 93. The I/O 95 is connected to the LD 93, the CCD driver 85, and the CPU 101.

The A/D converting section 91 is connected to the CCD sensor 86 of the position sensor 80 and converts an electric signal corresponding to a spot image input from the CCD sensor 86 into a digital signal. The S/N analyzing section 92 analyzes the digital signal input from the A/D converting section 91 to acquire light intensity distribution information on the distribution of light intensities of the spot image. The memory section 94 incorporates a volatile memory that stores analysis data indicative of analysis results input from the S/N analyzing section 92, and a nonvolatile memory that stores a control program. The processing section 93 controls the operation of the position sensor 80 via the I/O section 95 in accordance with the control program stored in the nonvolatile memory of the memory section 94. The processing section 93 inputs the light intensity distribution information acquired by the controller 90 to the CPU 101 as well.

A description will now be given of how the S/N analyzing section 92 analyzes a digital signal.

FIGS. 8A and 8B are diagrams showing light intensities I of light scattered from an irradiated surface of the intermediate transfer belt 41 detected by the CCD sensor 86 appearing in FIG. 6, wherein FIG. 8A shows a first example in which the irradiated surface of the intermediate transfer belt 41 is relatively rough, and FIG. 8B shows a second example in which the irradiated surface of the intermediate transfer belt 41 is relatively smooth.

In FIGS. 8A and 8B, the horizontal axis indicates pixel numbers n of pixels arranged on the acceptance surface of the CCD sensor 86 having N pixels in total, and the vertical axis indicates light intensities I detected in respective pixels. It should be noted that a value <I> of light intensity I indicates a mean light intensity indicative of a mean value of light intensities I detected in all the pixels of the CCD sensor 86.

As shown in FIG. 8A, when the irradiated surface of the intermediate transfer belt 41 is relatively rough and grainy, the light intensities I detected by the CCD sensor 86 vary greately relative to the mean light intensity <I> according to pixel numbers n and also vary in a random fashion. Thus, it can be said that light intensity distribution information indicative of the distribution (variations) of light intensities I as shown in FIG. 8A reflects the conditions of asperities specific to the surface of the intermediate transfer belt 41 as the distribution of light intensities of scattered light.

On the other hand, as shown in FIG. 8B, when the irradiated surface of the intermediate transfer belt 41 is relatively smooth, the light intensities I detected by the CCD sensor 86 do not vary greatly relative to the mean light intensity <I> according to pixel numbers n but vary in a random fashion. Thus, it can be said that light intensity distribution information in FIG. 8 as well reflects the conditions of asperities specific to the surface of the intermediate transfer belt 41 as the distribution of light intensities of scattered light.

The S/N analyzing section 92 is configured to acquire information specific to an irradiated surface of the intermediate transfer belt 41 as a numeric value by analyzing a digital signal corresponding to light intensity distribution information as shown in FIGS. 8A and 8B.

Specifically, in accordance with an equation (1) below, the S/N analyzing section 92 calculates the mean light intensity <I> (see FIGS. 8A and 8B) that is the mean value of light intensities of all the pixels from values of light intensities In of respective pixels constituting the CCD sensor 86 having, for example, N pixels in total.

$$\langle I \rangle = \frac{1}{N}\sum_{N} I_n \tag{1}$$

Next, by using the mean light intensity <I>, the contrast ratio (hereinafter referred to as "speckle contrast) Sc indicative of a difference between light and shade in the entire speckle pattern of a spot image of the intermediate transfer belt 41 in accordance with an equation (2) below. It should be noted that in the equation (2), A indicates a predetermined constant.

$$Sc = \frac{A \times \frac{1}{N}\sum_{N} |\langle I \rangle - I_n|}{\langle I \rangle} \tag{2}$$

The speckle contrast Sc thus calculated reflects the state of the irradiated surface of the intermediate transfer belt 41, and hence is information specific to the spot image of the intermediate transfer belt 41.

It should be noted that information specific to a spot image of the intermediate transfer belt 41 should not necessarily be the speckle contrast Sc, but may be any numeric value insofar as it can be indicative of surface roughness of the irradiated surface of the intermediate transfer belt 41 or can be acquired by image analysis performed on an image of the irradiated surface of the intermediate transfer belt 41. For example, the image frequency F that can be calculated by Fourier transform of light intensities of respective pixels may be used so as to regard differences between light and shade in the speckle pattern of a spot image of the intermediate transfer belt 41 as periods.

Also, the controller 90 in FIG. 6 can acquire phase information indicative of positions on the intermediate transfer belt 41, and a description thereof will be given below.

For example, in synchronization with timing in which a predetermined initial process (for example, a base density detecting process described later) is started, a spot image of the intermediate transfer belt 41 is acquired, and a phase address X1 is set as phase information indicative of the position of the spot image (see FIG. 9). When the endless intermediate transfer belt 41 makes one rotation, a spot image at the phase address X1 is acquired again, and therefore, phase information at an arbitrary position on the intermediate transfer belt 41 can be acquired using the phase address X1 as the reference position. It should be noted that whether or not spot images at the phase address X1 are identical before and after the intermediate transfer belt 41 makes one rotation can be determined by carrying out speckle pattern matching. As a consequence, in subsequent processes (for example, a patch image forming process described later) carried out after the initial process, the phase address X1 set in the initial process can be used as the reference position. In other words, each process can be synchronized with a phase corresponding to rotation of the intermediate transfer belt 41.

On the other hand, according to the prior art, it is necessary not only to form a registration mark on an intermediate transfer belt before starting a predetermined initial process but also to detect the formed registration mark at least once so as to determine the reference position for the initial process and the subsequent processes.

Thus, according to the present invention, since at least one reference position that can be used for a predetermined initial process and the subsequent processes can be set on the intermediate transfer belt 41 with ease, it is possible to carry out the initial process in an efficient manner while reducing downtime. Also, since no toner is used to set the reference position, it is possible to reduce costs and prevent smudges on the intermediate transfer belt 41 caused by toners. Further, since the reference position can be set in arbitrary timing, the effects of displacements of the reference position caused by thickness changes and expansion/contraction of the intermediate transfer belt 41 can be virtually eliminated as compared with those formed in advance such as a conventional registration mark.

As described above in detail, with the position sensor 80 and the controller 90 therefor in FIG. 6, it is possible to acquire phase information on the intermediate transfer belt 41, which is being rotating, with ease and at low cost merely by acquiring a spot image of the intermediate transfer belt 41 and analyzing a digital signal.

Also, since the position sensor 80 small in size suffices, upsizing of the image forming apparatus can be avoided, and also, the position sensor 80 can be easily incorporated into image forming apparatuses such as copying machines without arrangement limitations.

Figure 9:
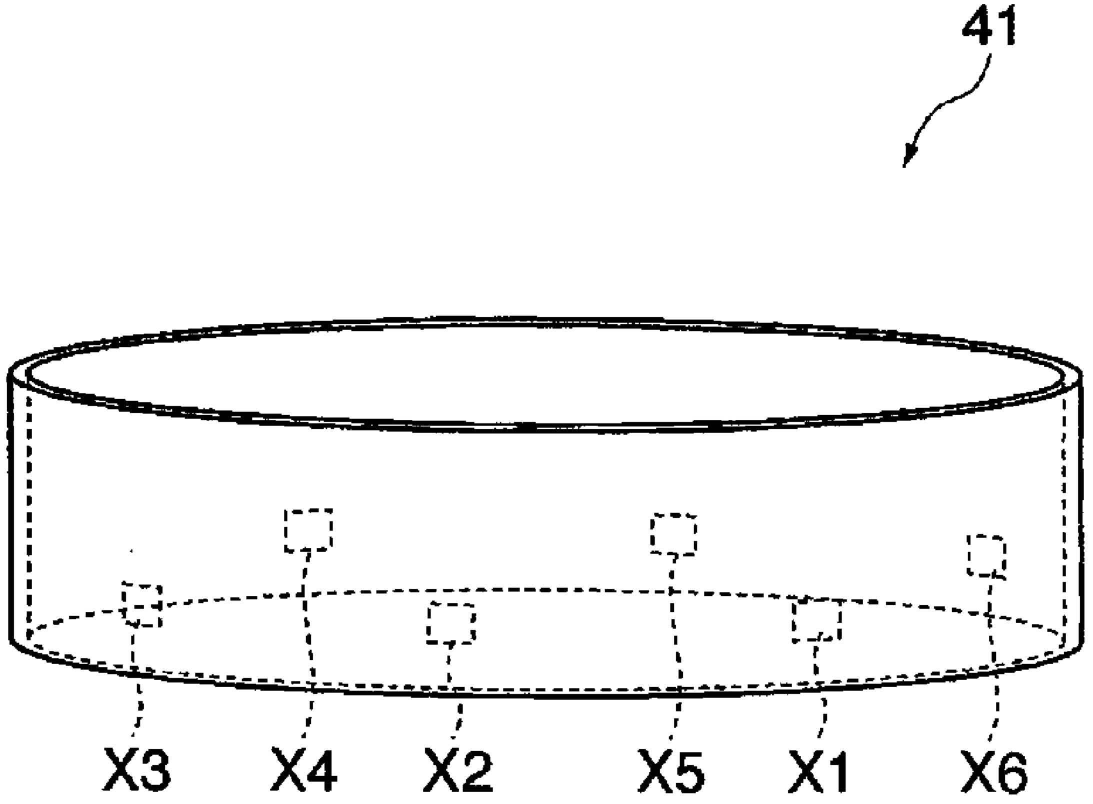
FIG. 9 is a perspective view showing the intermediate transfer belt spearing in FIG. 1, more particularly, the arrangement of phase addresses on the intermediate transfer belt appearing in FIG. 1.

FIG. 9 is a perspective view showing the intermediate transfer belt 41 appearing in FIG. 1 with phase addresses arranged thereon.

As shown in FIG. 9, a plurality of phase addresses, e.g. six phase addresses X1 to X6 may be set in such a manner that spot positions on the irradiated surface of the intermediate transfer belt 41 are at regular intervals on the intermediate transfer belt 41. In this case, it is preferred that speckles corresponding to the respective phase addresses X1 to X6 and the speckle contrasts Sc of the respective speckles are stored in advance as shown in FIG. 11A. This makes it possible to set a plurality of phase addresses as reference positions for the formation of a patch image 71 in the above-described tone correcting process, the formation of toner images, and the base density detecting process, described later.

A detailed description will now be given of the case where an image forming process is carried out as the above-mentioned initial process.

Figure 10:
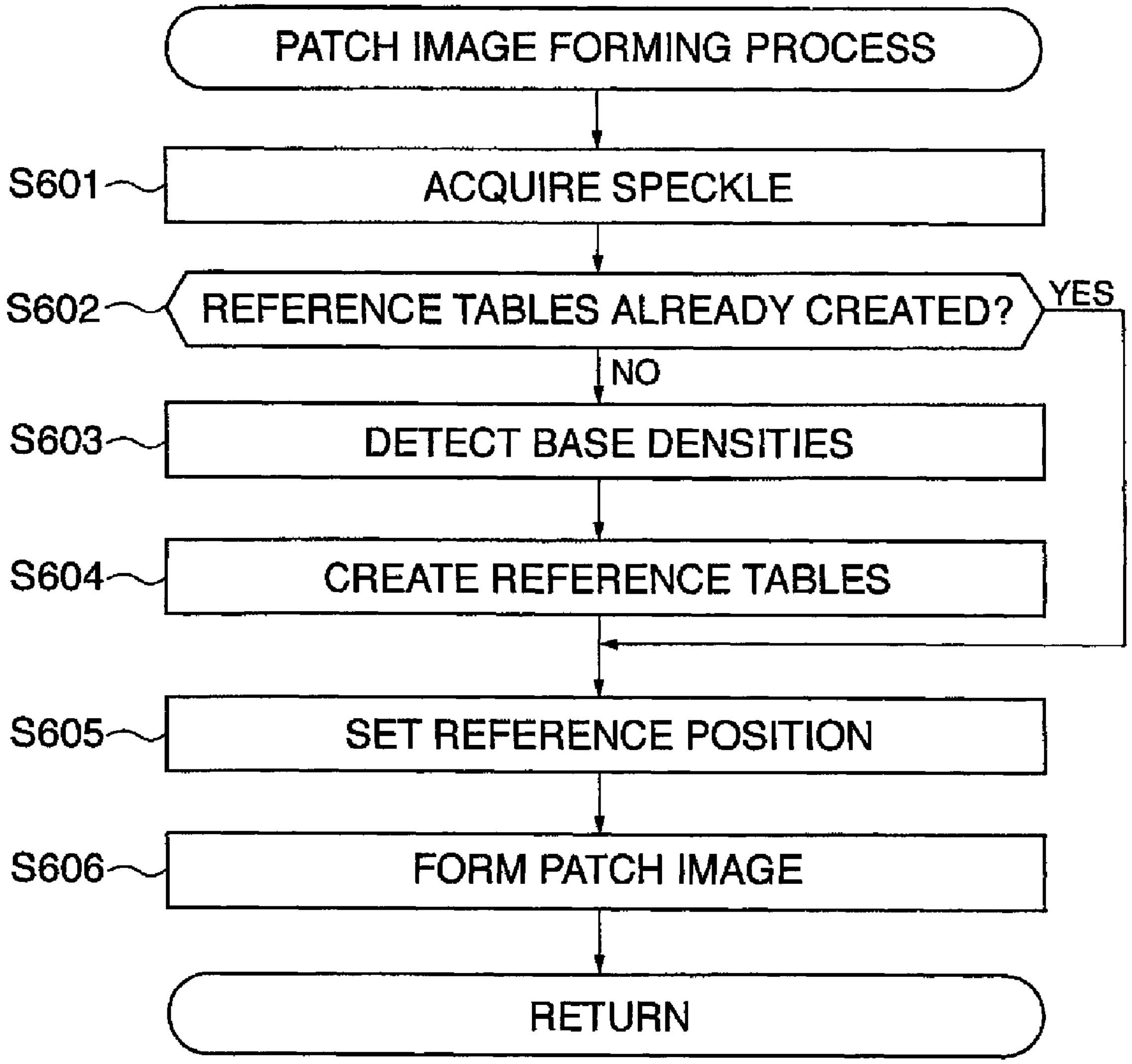
FIG. 10 is a flow chart showing in detail an image forming process carried out in a step S503 in FIG. 5.

FIG. 10 is a flow chart showing in detail the image forming process carried out in the step S503 in FIG. 5.

As shown in FIG. 10, first, the position sensor 80, which is capable of shooting the irradiated surface of the intermediate transfer belt 41 along the overall circumference thereof, shoots images, i.e. speckles on the irradiated surface in a continuous or intermittent basis and inputs them to the controller 90 (step S601). Next, in a step S602, it is determined whether or not reference tables as shown in FIGS. 11A and 11B, described later, are stored in the volatile memory of the memory section 94.

If, as a result of the determination in the step S602, there are no reference tables, the density sensor 70 starts detecting base densities indicative of color densities of the intermediate transfer belt 41 with no patch image formed thereon, the intermediate transfer belt 41 in a blank state (step S603). At this time, creation of reference tables, described later, is started (step S604), and the phase address X1 is set as the reference position for starting the base density detecting process.

FIGS. 11A and 11B are block diagrams showing reference tables created in the step S604 in FIG. 10, wherein FIG. 11A shows a reference table in which the phase addresses X1 to X6 in FIG. 9 and speckle contrasts Sc are associated with each other, and FIG. 11B shows a reference table in which the phase addresses X1 to X6 in FIG. 9 and base densities of the intermediate transfer belt 41 which is a base are associated with each other.

In this embodiment, the six phase addresses X1, X2, X3, X4, X5, and X6 are set as shown in FIG. 6. As described above, the phase address X1 is set as the reference position in the step S605. On the other hand, the phase addresses X2 o X6 are set in predetermined timing based on the overall circumference of the intermediate transfer belt 41 and the running speed of the intermediate transfer belt 41 in the belt running direction. At the same time, the speckle acquiring process in the step S601 and the base density detecting process in the step S603 are carried out.

In the speckle acquiring process in the step S601, speckles corresponding to the respective phase addresses X1 to X6 among a plurality of speckles input to the controller 90 are stored in the volatile memory of the memory section 94. The S/N analyzing section 92 analyzes corresponding electric signals and acquires, for example, speckle contrasts Sc1 to Sc6 as light intensity distribution information. The speckle contrasts Sc1 to Sc6 thus acquired are associated with the phase addresses X1 to X6 and the speckles corresponding thereto, so that a light intensity distribution reference table in FIG. 11A is created. The created light intensity distribution reference table is stored in the volatile memory of the memory section 94.

According to the light intensity distribution reference table in FIG. 11A, when the same speckle contrast Sc as any speckle contrast Sc in this table is acquired, a phase address indicative of a position on the intermediate transfer belt 41 can be identified.

The base densities detected in the base densities detecting process in the step S603 is input to the CPU 101. As shown in the reference table in FIG. 11B, the base densities are associated with phase addresses, i.e. X101, X102, X103, . . . , X1FF, X201, X202, X203, . . . , X2FF, . . . X6FF, which are finer subdivisions of the phase addresses X1 to X6. The base density reference table thus created is stored in the volatile memory of the memory section 94.

Here, the phase addresses X101, X201, X301, X401, X501, and X601 in FIG. 11B are associated with the respective phase addresses X1, X2, X3, X4, X5, and X6 in FIG. 11A. Specifically, the phase addresses X101 to X601 and the respective phase addresses X1 to X6 are associated with each other so that each of the phase addresses X101 to X601 and an associated one of the respective phase addresses X1 to X6 are indicative of the same position in the direction perpendicular to the belt running direction of the intermediate transfer belt 41. This corresponds to the arrangement of the density sensor 70 and the position sensor 80 at the same position in the direction perpendicular to the belt running direction. Thus, the light intensity reference table and the base density reference table can be associated with each other by way of phase addresses. It should be noted that the association of the phase addresses X101 to X601 and the respective phase addresses X1 to X6 have only to correspond to the arrangement of the density sensor 70 and the position sensor 80.

According to the base density reference table in FIG. 11B, the base densities of the intermediate transfer belt 41 detected in advance can be referred to from phase addresses associated with phase addresses identified in the light intensity distribution reference table in FIG. 11A.

Referring to FIG. 10 again, a patch image 71 as shown in FIGS. 3 and 4 is formed in a step S606. The process then returns to the process in FIG. 5 in which patch densities are detected (step S504). It should be noted that the patch image forming process (step S06) and the patch density detecting process (step S504) are carried out based on the reference position and the phase address set in the step S605. Specifically, the position of the patch image 71 formed on the intermediate transfer belt 41 in the conveying direction and the length of the patch image 71 are set in such a manner that they can be associated with a phase address registered in the base density reference table. Thus, the base density of the intermediate transfer belt 41, which is a base under the patch image 71, can be easily referred to from the phase address of the patch image 71 on the intermediate transfer belt 41.

If, as a result of the determination in the step S602, the light intensity reference table and the base density reference table have already been created, the reference position is set to, for example, the phase address X1 in the reference table, and the patch image forming process in the step S606 is carried out.

According to the process in FIG. 10, since the base density reference table for the intermediate transfer belt 41 is created (step S604), the tone correcting process in FIG. 5 can be carried out based on the base density of the intermediate transfer belt 41. Also, since a phase address is set (step S605), the patch image forming process and the patch density detecting process can be carried out based on the reference position set in the base density detecting process carried out as the initial process. Thus, it becomes unnecessary to form, for example, a registration mark on the intermediate transfer belt 41 in advance and read the mark, and therefore, the time required to carry out the tone correcting process in FIG. 5 can be shortened. As a consequence, the tone correcting process and the subsequent image forming process carried out by the copying machine 100 can be made more efficient (productivity is improved).

Also, the process in FIG. 10 further shortens the time required to carry out the tone correcting process since a plurality of phase addresses are used as the reference positions.

Specifically, the distance L covered by rotational movement of the intermediate transfer belt 41 required to read a patch image 71 is expressed by an equation (3) below.

$$L=L\text{itb}/N\text{base}+L\text{patch}\times N\text{patch} \qquad (3)$$

It should be noted that in the above equation (3), Litb indicates the overall circumference of the intermediate transfer belt 41, Npatch indicates the length of each color patch image constituting the patch image 71, Npatch indicates the number of colors, i.e. the number of patch images, and Nbase indicates the number of phase addresses set on the intermediate transfer belt 41 (base), i.e. the number of reference positions.

On the other hand, if a single phase address is used as the reference position, the distance L' covered by rotational movement of the intermediate transfer belt 41 required to read a patch image 71 is expressed by an equation (4) below.

$$L=L\text{itb}+L\text{patch}\times N\text{patch} \qquad (4)$$

As will be clear from comparison between the equations (3) and (4), the overall circumference of the intermediate transfer belt 41 is divided according to the number of reference positions, and therefore, the time required to control, for example, reading of a patch image 71 can be shortened.

In this embodiment, speckles having two-dimensional speckle patterns reflecting surface conditions specific to the intermediate transfer belt 41 are registered in association with phase addresses in the light intensity distribution reference table in FIG. 11A. Pattern matching between a speckle pattern registered in the light intensity distribution reference table and a speckle pattern acquired in arbitrary timing is performed, and when these speckle pattern match, a position in the direction of the circumference of the intermediate transfer belt 41, i.e. a phase address can be identified. A description will now be given of the case where speckle patterns do not match in part as a result of pattern matching.

Figure 12:
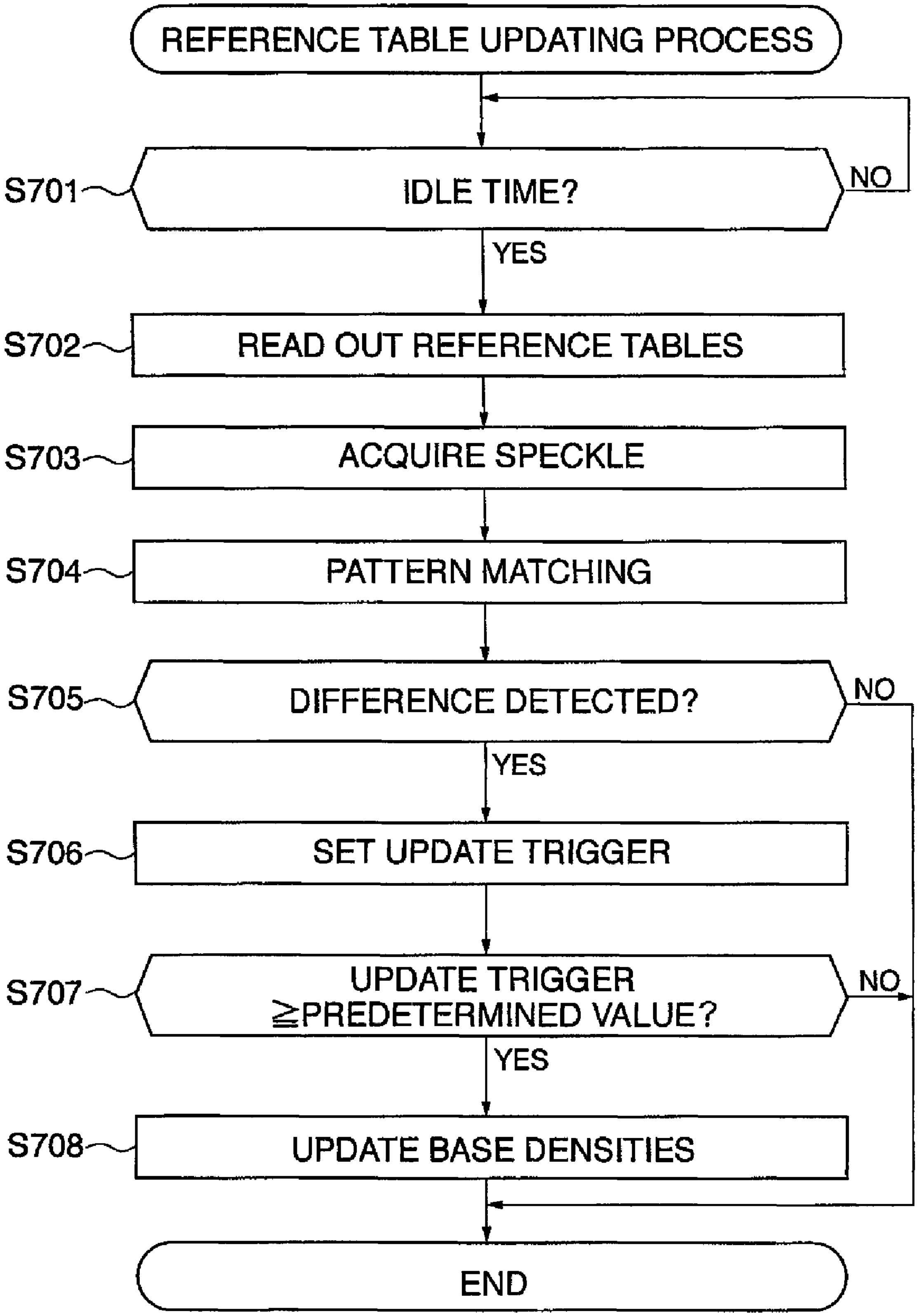
FIG. 12 is a flow chart showing a reference table updating process in which a reference table created in the step S604 in FIG. 10 is updated.

FIG. 12 is a flow chart showing a reference table updating process in which the light intensity distribution reference table in FIG. 11A created in the step S604 in FIG. 10 is updated.

As shown in FIG. 12, first, it is determined in a step S701 whether or not the copying machine 100 is sitting idle in an idle time, which is a time during which image formation is not carried out, e.g. when power supply to the copying machine 100 is turned on, or immediately after the intermediate transfer belt 41 is replaced with another one.

If, as a result of the determination in the step S701, the copying machine 100 is not sitting idle, it is awaited that the copying machine 100 becomes idle, and on the other hand, if the copying machine 100 is sitting idle, the light intensity distribution reference table is read out (step S702). At this time, the base density reference table is also read out. It should be noted that in the step S702, a speckle shot a predetermined time period earlier may be acquired instead of reading the light intensity distribution reference table.

Next, speckles are acquired at the phase addresses X1 to X6 registered in the light intensity distribution reference table read out in the step S702 using the position sensor 80 (step S703). For example, at the phase address X1, a speckle 700' having a speckle pattern as illustrated in FIG. 13A is acquired.

Next, in a step S704, pattern matching between the speckle patterns registered in the light intensity distribution reference table read out in the step S702 (predicted values of light intensities I) and the speckle patterns of the speckles acquired in the step S703 (observed values of light intensities I) is performed. As a result of the pattern matching, absolute values of difference values between the binary-coded speckle patterns are also detected in respective pixels.

Figure 13A:
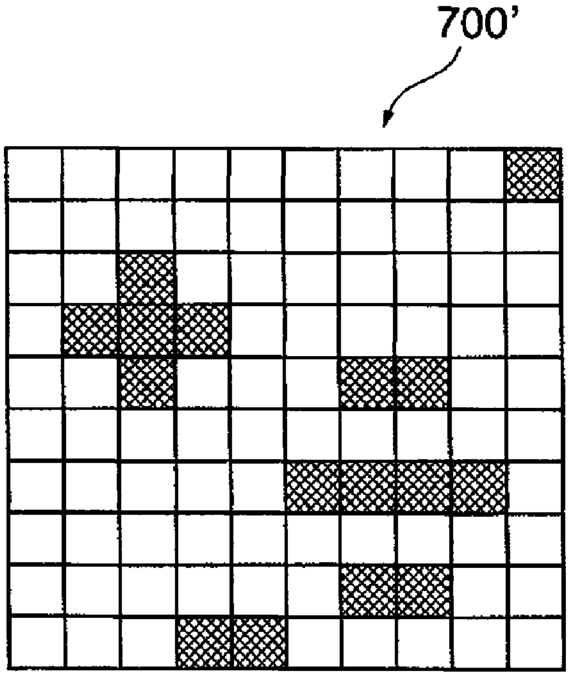
FIG. 13A is a view showing a first example of a speckle of the intermediate transfer belt shot by the position sensor in FIG. 6.
Figure 13B:
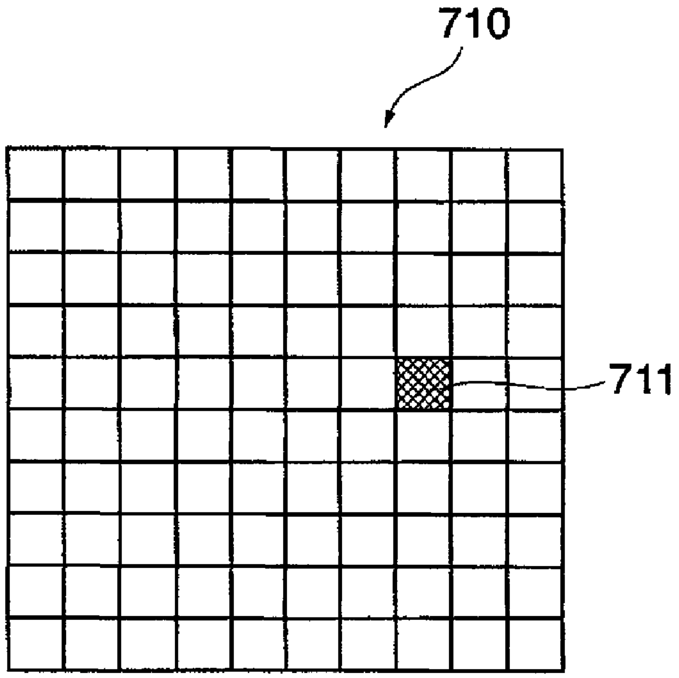
FIG. 13B is a view showing a result of pattern marching between the speckle in FIG. 7 and the speckle in FIG. 13.

FIG. 13B is a diagram showing a result of pattern marching between the speckle 700 in FIG. 7 and the speckle 700' in FIG. 13A.

A difference speckle 710 in FIG. 13B is the result of the pattern matching in the step S704 and indicates that the absolute value of a difference value in one pixel 711 is "1". If the absolute value of a difference value is "1", this means that the light intensity I has increased from a value less than the threshold value to a value equal to or greater than the threshold value or has decreased from a value equal to or greater than the threshold value to a value less than the threshold value. Such an increase or decrease in light intensity indicates a change in the properties of the intermediate transfer belt 41 as the base and contamination of the intermediate transfer belt 41 caused by toners or the like. Examples of such a change in the properties of the intermediate transfer belt 41 include a surface flaw caused by long-term usage of the intermediate transfer belt 41 and a change in the conditions of microscopic asperities (shapes) on the surface of the intermediate transfer belt 41 caused by wear.

Referring to FIG. 12 again, in a step S705, it is determined whether or not a difference value other than "0", i.e. a difference between the predicted value and the observed value has been detected at the same phase address as a result of the pattern matching in the step S704. If, as a result of the determination in the step S705, an absolute value "1" of a difference value has been detected in one pixel of a difference speckle as shown in FIG. 13B, a value "1" is set as the amount of difference relating to this phase address.

Setting the amount of difference as mentioned above is carried out at all the phase addresses X1 to X6, and the total amount of differences at all the phase addresses X1 to X6 is set as an update trigger value, which is a parameter for updating the base density reference table in FIG. 11B. It should be noted that, if an absolute value "1" of a difference value has been detected in a plurality of pixels in one difference speckle, the corresponding value is set as the amount of difference.

Next, in a step S707, it is determined whether or not the update trigger value is equal to or greater than a predetermined value, for example, "6." If, as a result of the determination in the step S707, the update trigger value is equal to or greater than the predetermined value, the steps S603 to S604 in FIG. 10 are executed to detect base densities and update the base density reference table (step S708). At this time, the light intensity distribution reference table is also updated based on the speckle acquired in the step S703, followed by terminating the process.

It should be noted that, if, as a result of the determination in the step S705, no difference has been detected in difference speckles at all the phase addresses, or if, as a result of the determination in the step S705, the update trigger value is smaller than the predetermined value, the process is terminated.

According to the process in FIG. 12, pattern matching between speckle patterns registered in the light intensity distribution reference table and speckle patterns of acquired speckles is performed to acquire difference speckles (step S704), so that changes in speckle patterns over time are detected. Thus, changes in the properties of the intermediate transfer belt 41 as the base and contamination of the intermediate transfer belt 41 caused by toners or the like can be detected.

Also, since the acquisition of speckles by the position sensor 80 does not affect image formation such as the formation of a patch image 71, the base density reference table updating process in the step S708 can be carried out while the copying machine 100 is sitting idle (YES to the step S701). Thus, the steps S603 to S604 in FIG. 10, for example, can be skipped, and hence image formation can be performed in an efficient manner while further reducing downtime.

It should be noted that although the update trigger value set in the step S706 in FIG. 12 is associated with all the phase addresses, a plurality of update trigger values may be set in association with respective phase addresses. In this case, it is preferred that the base density reference table is updated when at least one of a plurality of update trigger values becomes equal to or greater than a predetermined value. This makes it possible to cope with local changes in the physical properties of the intermediate transfer belt 41.

Figure 14:
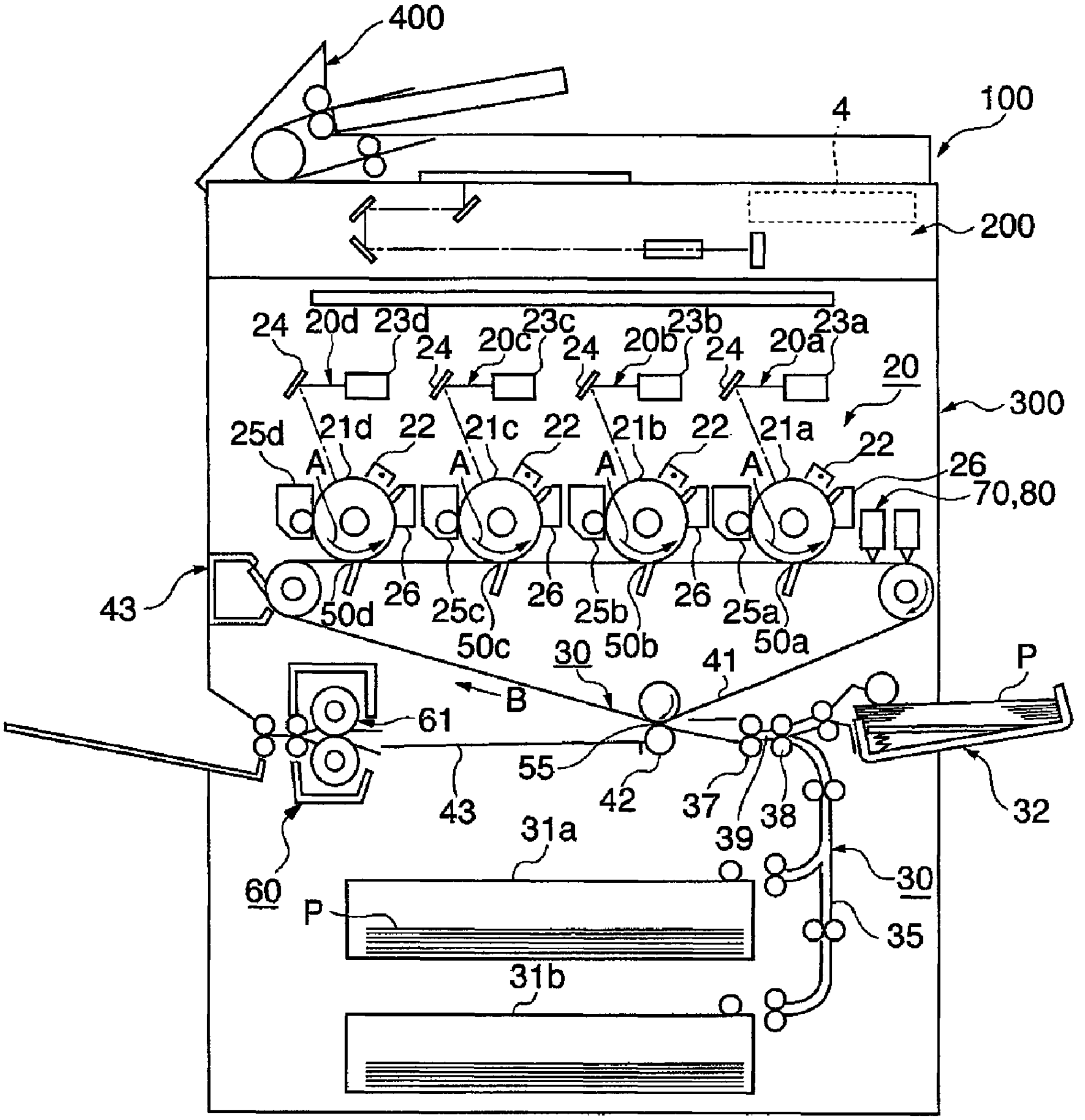
FIG. 14 is a sectional view schematically showing a copying machine that is an image forming apparatus according to a second embodiment of the present invention.

FIG. 14 is a view schematically showing the construction of a copying machine that is an image forming apparatus according to a second embodiment of the present invention.

A digital color copying machine 100' according to this embodiment is comprised of component elements having substantially the same functions as the functions of the component elements of the digital color copying machine 100 according to the first embodiment, and therefore, they are denoted by the same reference numerals and description thereof is omitted.

While the copying machine 100 is a 1D-type image forming apparatus comprised of the single photosensitive drum 21, the copying machine 100' in FIG. 14 is a 4D-type (inline type) image forming apparatus comprised of four sensitive drums 21*a*, 21*b*, 21*c*, and 21*d*. Exposure sections 23*a*, 23*b*, 23*c*, and 23*d* and developing units 25*a*, 25*b*, 25*c*, and 25*d* storing yellow (Y), magenta (M), cyan (C), and black (Bk) toners, respectively, are disposed in opposed relation to peripheries of the respective photosensitive drums 21*a*, 21*b*, 21*c*, and 21*d*. The photosensitive drums 21*a* to 21*d* are in contact with an intermediate transfer belt 41 at respective transfer positions 50*a*, 50*b*, 50*c*, and 50*d*. The transfer positions 50*a*, 50*b*, 50*c*, and 50*d* are arranged in a line and spaced at regular intervals.

The exposure sections 23*a* to 23*d* form electrostatic latent images on the respective photosensitive drums 21*a* to 21*d*. The developing units 25*a* to 25*d* develop the electrostatic latent images formed on the photosensitive drums 21*a* to 21*d* as toner images of the respective colors using toners of the respective colors. The toner images of the respective colors on the photosensitive drums 21*a* to 21*d* are sequentially transferred onto the intermediate transfer belt 41 at the respective transfer positions 50*a* to 50*d*. The transfer of the toner images is carried out in accordance with the rotation of the intermediate transfer belt 41, so that the toner images of the respective colors are superposed on the intermediate transfer belt 41 to form one full-color toner image.

Accordingly, in the copying machine 100', four toner images need to be superposed on the intermediate transfer belt 41 with high accuracy. In the present embodiment, as is the case with the above-described first embodiment, phase addresses are set on the intermediate transfer belt 41 in accordance with intervals between the transfer positions 50*a* to 50*d*, and therefore four toner images can be superposed on the intermediate transfer belt 41 with high accuracy.

It should be noted that although in the first and second embodiments described above, the intermediate transfer belt 41 is given as an example of an object to be detected by the position sensor 80, there is no intention to limit the present invention to this. For example, the photosensitive drum 21 appearing in FIG. 1, the photosensitive drums 21*a* to 21*d* appearing in FIG. 14, and an electrophotographic photosensitive drum of an endless belt type, i.e. a photosensitive belt may be an object to be detected by the position sensor 80. Also, the number of position sensors 80 should not necessarily be one, but may be two or more.

Also, although in the reference tables in the above-described embodiments, a plurality of phase addresses are set at predetermined intervals, they may be set in such a manner that irradiated surfaces of the intermediate transfer belt 41 irradiated by the LED 84 may be set to be continuous along the overall circumference of the intermediate transfer belt 41.

In the above-described embodiments, the total number N of pixels of the CCD sensor 86 and the size of the matrixes illustrated in FIGS. 7, 13A, and 13B should not necessarily be 100. Also, the above-mentioned threshold values and predetermined values are changeable.

Although in the above-described embodiments, the density sensor 70 and the position sensor 80 are disposed as separate members in opposed relation to the intermediate transfer belt 41, the density sensor 70 and the position sensor 80 may be configured as one integral unit, which would make installation easier.

Further, although in the above-described embodiments, the copying machines 100 and 100' carry out the tone correcting process using a patch image 71, they may not only carry out the tone correcting process but also provide control to change image forming conditions such as light exposure and developing bias using a patch image 71.

Also, although in the above-described embodiments, the present invention is applied to color copying machines, they may be applied to monochrome copying machines. Further, the present invention should not necessarily be applied to copying machines but may be applied to image forming apparatuses such as printers.

It is to be understood that the object of the present invention may also be accomplished by supplying a system or an apparatus with a storage medium in which a program code of software, which realizes the functions of any of the above-described embodiments is stored, and causing a computer (or CPU or MPU) of the system or apparatus to read out and execute the program code stored in the storage medium.

In this case, the program code itself read from the storage medium realizes the functions of any of the above-described embodiments, and hence the program code and the storage medium in which the program code is stored constitute the present invention.

Examples of the storage medium for supplying the program code include a Floppy® disk, a hard disk, a magneto-optical disk, a CD-ROM, a CD-R, a CD-RW, a DVD-ROM, a DVD-RAM, a DVD-RW, a DVD+RW, a magnetic taper a nonvolatile memory card, and a ROM. Alternatively, the program code may be downloaded via a network.

Further, it is to be understood that the functions of any of the above-described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above-described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2006-108041, filed Apr. 10, 2006 which is hereby incorporated by reference herein in its entirety.

What is claimed is:

1. An image forming apparatus that carries out an image forming process in which an image is formed on an image bearing member, comprising:

a light emitting unit adapted to emit laser beam onto the image bearing member;

a light intensity detecting unit adapted to detect light intensities of a speckle pattern resulting from the laser beam reflected by a part of a surface of the image bearing member on which an image is not formed;

a light intensity distribution information acquiring unit adapted to acquire light intensity distribution information on a distribution of the detected light intensities of the speckle pattern;

a phase information acquiring unit adapted to acquire phase information on phases on the image bearing member based on the light intensity distribution information of the speckle pattern;

a processing unit adapted to carry out the image forming process in synchronization with a predetermined phase included in the acquired phase information;

and an image bearing member density detecting unit adapted to detect a density of the image formed on the image bearing member;

wherein said image bearing member density detecting unit adapted to detect the density of the image formed on the image bearing member in accordance with the phase information by said phase information acquiring unit;

wherein said processing unit comprises a density characteristic information correcting unit adapted to correct density characteristic information comprising at least one of a density and a tone of an image to be formed on the image bearing member, and a table creating unit adapted to create a table in which the acquired phase information and the density characteristic information are associated with each other.

2. An image forming apparatus according to claim 1, further comprising updating unit adapted to update the created table.

3. An image forming apparatus according to claim 1, wherein the image bearing member comprises at least one of an intermediate transfer member and a photosensitive member.

4. An image forming method for carrying out an image forming process in which an image is formed on an image bearing member, comprising:

a light emitting step of radiating laser beam onto the image bearing member;

a light intensity detecting step of detecting light intensities of a speckle pattern resulting from the laser beam reflected by a part of a surface of the image bearing member on which an image is not formed;

a light intensity distribution information acquiring step of acquiring light intensity distribution information on a distribution of the detected light intensities of the speckle pattern;

a phase information acquiring step of acquiring phase information on phases on the image bearing member based on the light intensity distribution information of the speckle pattern;

a processing step of carrying out the image forming process in synchronization with a predetermined phase included in the acquired phase information; and an image bearing member density detecting step of detecting a density of the image formed on the image bearing member;

wherein, in said image bearing member density detecting step, the density of the image formed on the image bearing member is detected in accordance with the phase information in said phase information acquiring step wherein said processing step comprises a density characteristic information correcting step of correcting density characteristic information comprising at least one of a density and a tone of an image to be formed on the image bearing member, and a table creating step of creating a table in which the acquired phase information and the density characteristic information are associated with each other.

5. An image forming method according to claim 4, further comprising an updating step of updating the created table.

6. An image forming method according to claim 4, wherein the image bearing member comprises at least one of an intermediate transfer member and a photosensitive member.

* * * * *